(12) United States Patent
Christie, IV

(10) Patent No.: US 7,519,020 B2
(45) Date of Patent: Apr. 14, 2009

(54) ENABLING A PACKET-BASED COMMUNICATION CLIENT AS A MOBILE TERMINAL

(75) Inventor: Samuel H. Christie, IV, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 527 days.

(21) Appl. No.: 10/973,173

(22) Filed: Oct. 26, 2004

(65) Prior Publication Data

US 2006/0087991 A1    Apr. 27, 2006

(51) Int. Cl.
*H04Q 7/28* (2006.01)
(52) U.S. Cl. ............... 370/328; 370/352; 370/351; 455/435.1; 455/433; 709/238
(58) Field of Classification Search ......... 370/352, 370/329, 401, 328, 351; 455/554.1, 426.1, 455/433, 435.1; 709/238
See application file for complete search history.

(56) References Cited

U.S. PATENT DOCUMENTS

| 6,757,266 | B1 * | 6/2004 | Hundscheidt | 370/328 |
| 6,795,444 | B1 * | 9/2004 | Vo et al. | 370/401 |
| 6,940,848 | B1 | 9/2005 | Liu et al. | 370/352 |
| 2002/0114320 | A1 | 8/2002 | Ogren | 370/352 |
| 2003/0139180 | A1 | 7/2003 | McIntosh et al. | 455/426 |
| 2005/0047399 | A1 | 3/2005 | Lee et al. | 370/352 |
| 2005/0195762 | A1 | 9/2005 | Longoni et al. | 370/328 |
| 2005/0282543 | A1 * | 12/2005 | Idnani et al. | 455/432.1 |
| 2006/0030357 | A1 * | 2/2006 | McConnell et al. | 455/554.1 |
| 2006/0045069 | A1 * | 3/2006 | Zehavi et al. | 370/352 |

OTHER PUBLICATIONS

Liao, Wanjiun and Lui, Jen-Chi, "VoIP Mobility in IP/Cellular Network Internetworking," IEEE Communications Magazine, Apr. 2000, pp. 70-75.
International Search Report for PCT/IB2005/003200 mailed Mar. 7, 2006.

* cited by examiner

*Primary Examiner*—Danh C Le
(74) *Attorney, Agent, or Firm*—Withrow & Terranova, P.L.L.C.

(57) ABSTRACT

The present invention provides a service node to facilitate the integration of cellular and packet networks. In particular, the service node acts as a proxy for packet-based communications over a packet network for a packet communication client, and also emulates a call routing entity associated with a cellular network. In select embodiments, the call routing entity emulated by the service node may be a visited mobile switching center, home mobile switching center, or a home location register. In operation, calls being processed in the cellular network may be processed in part by the service node, which is emulating a particular call routing entity. For calls involving the cellular network that are ultimately terminated on the packet network, the service node supports efficient call processing or handling, depending on the call routing entity being emulated.

10 Claims, 6 Drawing Sheets

ENABLING A PACKET-BASED COMMUNICATION CLIENT AS A MOBILE TERMINAL

FIELD OF THE INVENTION

The present invention relates to communications, and in particular to integrating packet-based communication clients with traditional cellular networks.

BACKGROUND OF THE INVENTION

The evolution of mobile communications had led to an extensive cellular infrastructure, which is integrally connected to the Public Switched Telephone Network (PSTN). Traditionally, cellular networks and the PSTN have supported voice communications, while packet networks have been predominantly used for data communications. In recent years, packet networks have been used to support voice communications. Since cellular networks and the PSTN dominate voice communications, there is a need to integrate packet networks, cellular networks, and the PSTN for voice communications, especially for evolving packet-based communication clients. There is a further need to allow packet-based communication clients to readily make and receive calls supported in part over the PSTN or cellular networks in an efficient manner.

SUMMARY OF THE INVENTION

The present invention provides a service node to facilitate the integration of cellular and packet networks. In particular, the service node acts as a proxy for packet-based communications over a packet network for a packet communication client, and also emulates a call routing entity associated with a cellular network. In select embodiments, the call routing entity emulated by the service node may be a visited mobile switching center, home mobile switching center, or a home location register. In operation, calls being processed in the cellular network may be processed in part by the service node, which is emulating a particular call routing entity. The cellular network need not be aware that the service node is not an actual home mobile switching center, visited mobile switching center, or home location register. For calls involving the cellular network that are ultimately terminated on the packet network, the service node supports efficient call processing or handling, depending on the call routing entity being emulated.

In one embodiment, the service node acts as a proxy for packet communications for a packet communication client, as well as emulates a visited mobile switching center. To the cellular network, the service node will appear as a visited mobile switching center that is supporting the packet communication client. Although a packet-based session will be used to establish a part of the call to the packet communication client, the cellular network will interact with the service node as if it were a traditional visited mobile switching center. Similarly, the service node may emulate a home mobile switching center, wherein from the cellular network's perspective the service node appears as a home mobile switching center by which the packet communication client or other mobile terminal may be supported. As such, incoming calls are initially directed to the home mobile switching center, which may interact with a home location register to determine how to route the incoming call or make decisions on call routing based on whether or not the packet communication client is registered with the home mobile switching center. In the latter case, interaction with the home location register is not necessary, but may be provided to assist in call processing.

In yet another embodiment, the service node may act as a proxy for the packet communication client, as well as acting as a home location register for the cellular network. As such, traditional home location register operation may be provided, in which interaction with various visited and home mobile switching centers is provided. In addition, packet-based communication clients may directly register with the service node, such that the service node, acting in a home location register capacity, may control where and how calls are routed to mobile terminals as well as to packet-based communication clients. Notably, the packet-based communication clients may be multimode devices in which traditional cellular communications as well as packet-based communications may be facilitated. As such, one device may act as a mobile terminal and a packet-based communication client, and therefore communicate over a cellular network in a traditional fashion and over a packet network in a packet-based fashion. Packet communications may be facilitated using wired or wireless technologies.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention allows a service node associated with a packet network to emulate a traditional entity of a cellular network, such as a mobile switching center or home location register, to allow a packet-based communication client to establish calls over the cellular network, and thus over the PSTN as well. Prior to delving into the details of the present invention, an overview of a basic registration and call setup process in a cellular environment is illustrated.

Figure 1:
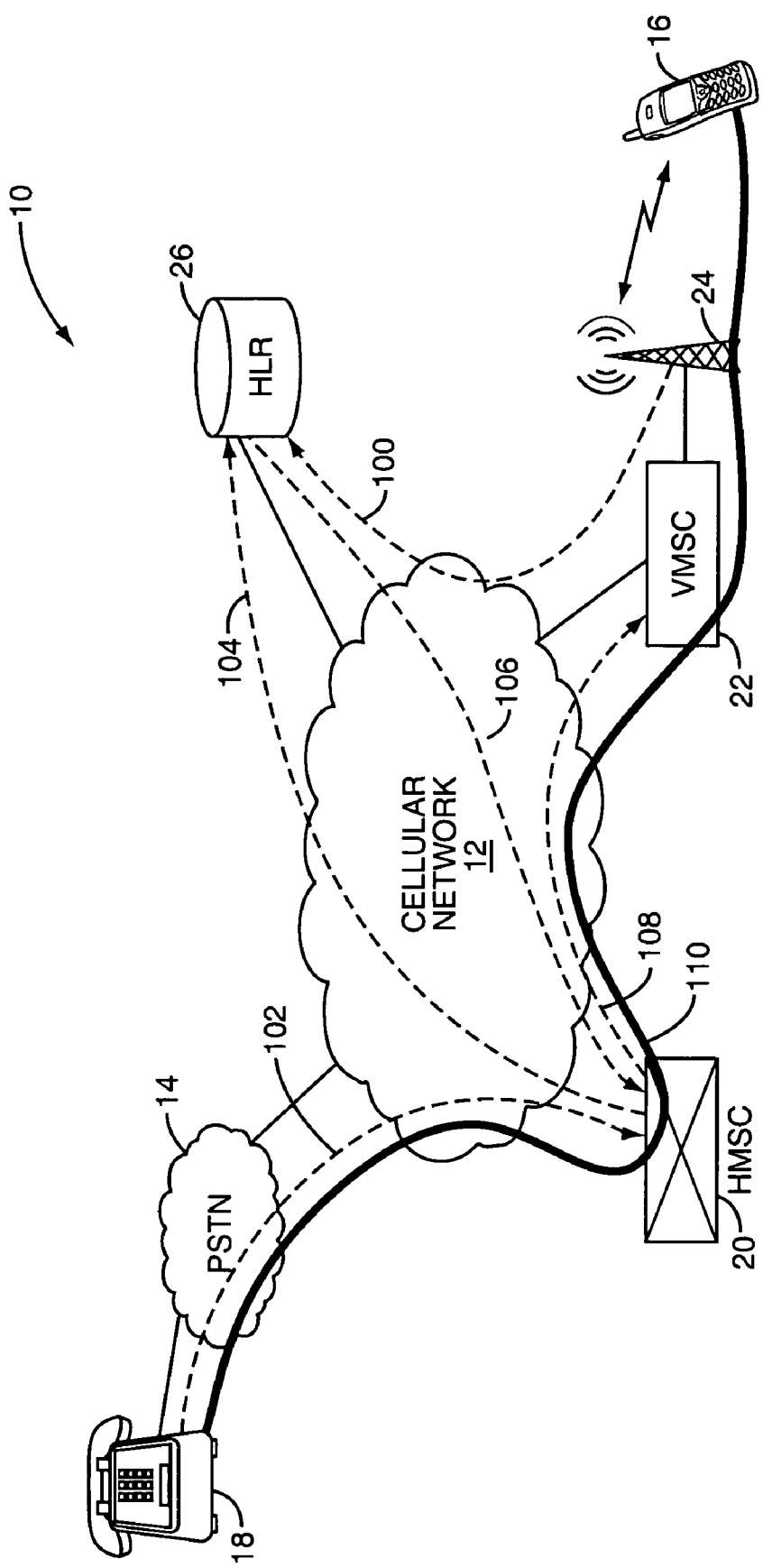
FIG. 1 is a traditional cellular communication environment, and illustrates an exemplary registration and call setup sequence.

With reference to FIG. 1, a communication environment 10 is shown centered about a traditional cellular network 12. In traditional fashion, the cellular network 12 interacts with the PSTN 14. Calls between a mobile terminal 16 supported by the cellular network 12 and a telephone terminal 18, which is supported by the PSTN 14, may be established over the PSTN 14 and the cellular network 12. Generally, a mobile terminal 16 is associated with a home mobile switching center (HMSC) 20, which acts as a gateway for all communications terminating to the mobile terminal's telephone number. When the mobile terminal 16 is outside of the radio access network specifically associated with the HMSC 20, cellular communications will be established through a currently supporting visiting MSC (VMSC) 22 and an associated base station 24, which provides a wireless interface to the mobile terminal 16.

When a mobile terminal 16 is supported by a VMSC 22, a registration message is sent to a home location register (HLR) 26 (step 100). The registration message provides the HLR 26 with sufficient information to identify the mobile terminal 16 and the VMSC 22 currently supporting the mobile terminal 16, such that calls intended for the mobile terminal 16 that are received at the HMSC 20 can be properly routed to the mobile terminal 16 through the supporting VMSC 22. Thus, when a call is directed to the mobile terminal 16 from the telephone terminal 18, a call setup request is sent to the HMSC 20 (step 102). If the mobile terminal 16 is not being supported by the HMSC 20, the HMSC 20 will send a location query to the HLR 26 (step 104) to retrieve information identifying the VMSC 22 currently supporting the mobile terminal 16. The HLR 26 will respond with the requisite information (step 106), and the HMSC 20 will forward the call request to the VMSC 22 currently supporting the mobile terminal 16 (step 108). At this point, the HMSC 20 and VMSC 22 can cooperate with one another and any other necessary network entities to establish a bearer path between the telephone terminal 18 and the mobile terminal 16 through the PSTN 14, HMSC 20, and VMSC 22 of the cellular network 12 (step 110). Notably, other variations such as directing a call to a voicemail server in the event the terminal 16 is not currently registered may be supported.

Figure 2:
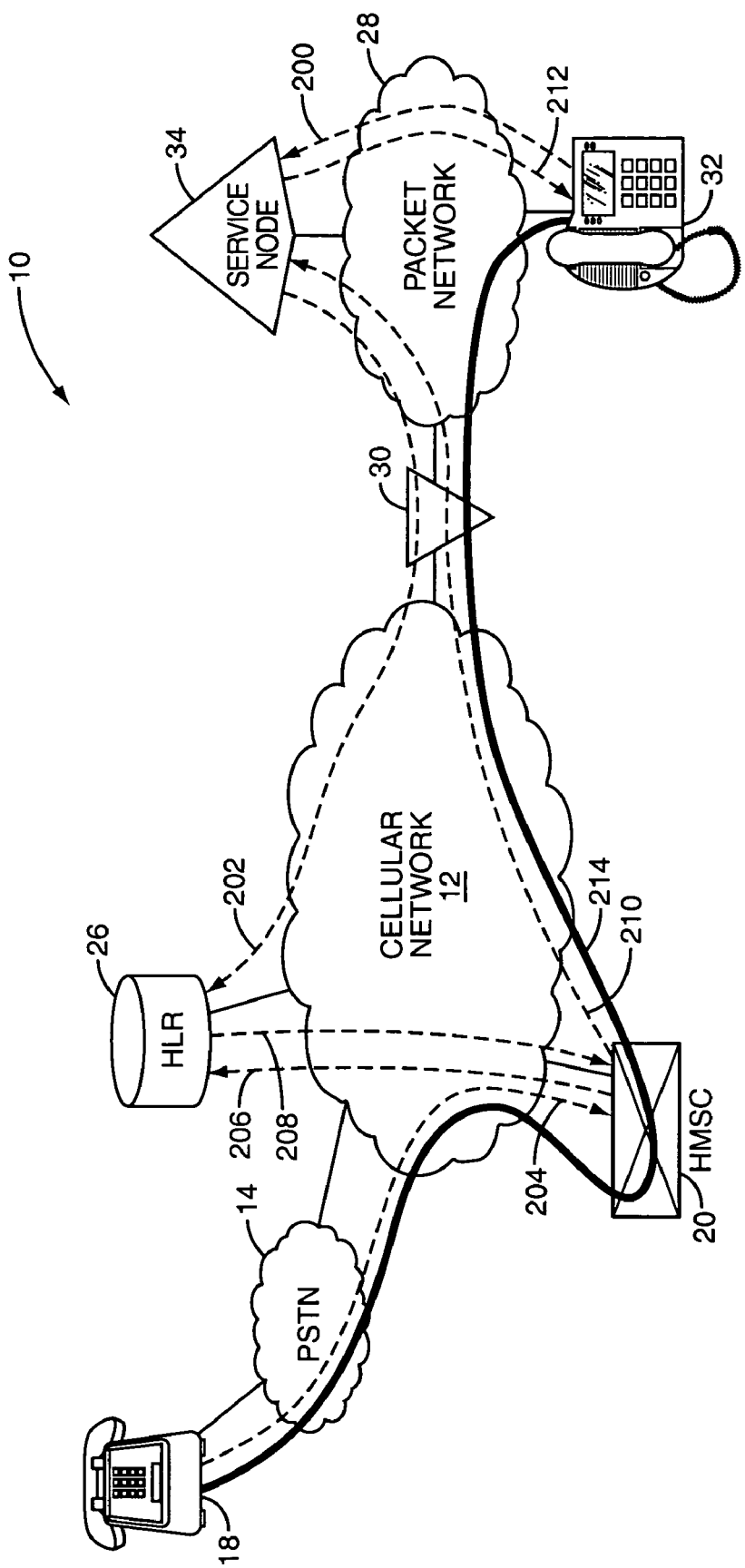
FIG. 2 is a communication environment in which a service node associated with a packet network emulates a visiting mobile switching center of a cellular network according to one embodiment of the present invention.

Turning now to FIG. 2, a first embodiment of the present invention is illustrated. In this embodiment, a packet network 28 is coupled to the cellular network 12 through an appropriate gateway 30, which will provide the necessary signal conversion to facilitate communications between the cellular network 12 and the packet network 28. The packet network 28 will support a packet-based communication client 32, which may have a connection to the packet network 28 through a wired or wireless interface. In this embodiment, a service node 34 is configured to act as a proxy for communications involving the packet-based communication client 32. Further, the service node 34 is configured to emulate a VMSC on the cellular network 12. As such, the packet-based communication client 32 will appear as if it is a mobile terminal being supported by the VMSC emulated by the service node 34. Thus, the cellular network 12 does not have to realize that the packet-based communication client 32 is not a typical mobile terminal 16. As such, the packet-based communication client 32 will register with the service node 34 upon being able to communicate with the packet network 28 (step 200). The service node 34 will recognize the registration and, acting as a VMSC, register the packet-based communication client 32 with the HLR 26 (step 202) as if the packet-based communication client 32 were a mobile terminal supported by a typical VMSC.

When a call is initiated from the telephone terminal 18, a call setup request is sent through the PSTN 14 to the HMSC 20 of the cellular network 12 (step 204). The HMSC 20 will recognize that the packet-based communication client 32 is not supported by the HMSC 20, and thus will send a location query to the HLR 26 (step 206). The HLR 26 will then respond by providing information bearing on how to route the call to the packet-based communication client 32 (step 208). In this case, the routing information will include a directory number or address for the gateway 30 and associated with the service node 34, as it is emulating a VSMC. Thus, the call setup request will be routed to the service node 34 through the gateway 30 (step 210). Upon receipt of the call setup request, the service node 34 will route the call to the packet-based communication client 32 (step 212). At this point, a bearer path is established between the telephone terminal 18 and the packet-based communication client 32 through the PSTN 14, the HMSC 20 of the cellular network 12, the gateway 30, and the packet network 28 (step 214). Notably, a circuit-switched session is established between the gateway 30 and the telephone terminal 18, and a packet session is established between the gateway 30 and the packet-based communication client 32.

Those skilled in the art will recognize that additional messaging will take place throughout the various networks to establish the circuit-switched and packet-based sessions. In one embodiment, the Session Initiation Protocol (SIP) may be used for the call signaling taking place over the packet network 28 between the gateway 30, service node 34, and packet-based communication client 32. The service node 34 in a SIP embodiment will act as a SIP proxy for establishing packet-based sessions, as well as emulate a VMSC in cooperation with the gateway 30. Those skilled in the art will recognize other protocols capable of being implemented according to the concepts of the present invention.

Figure 3A:
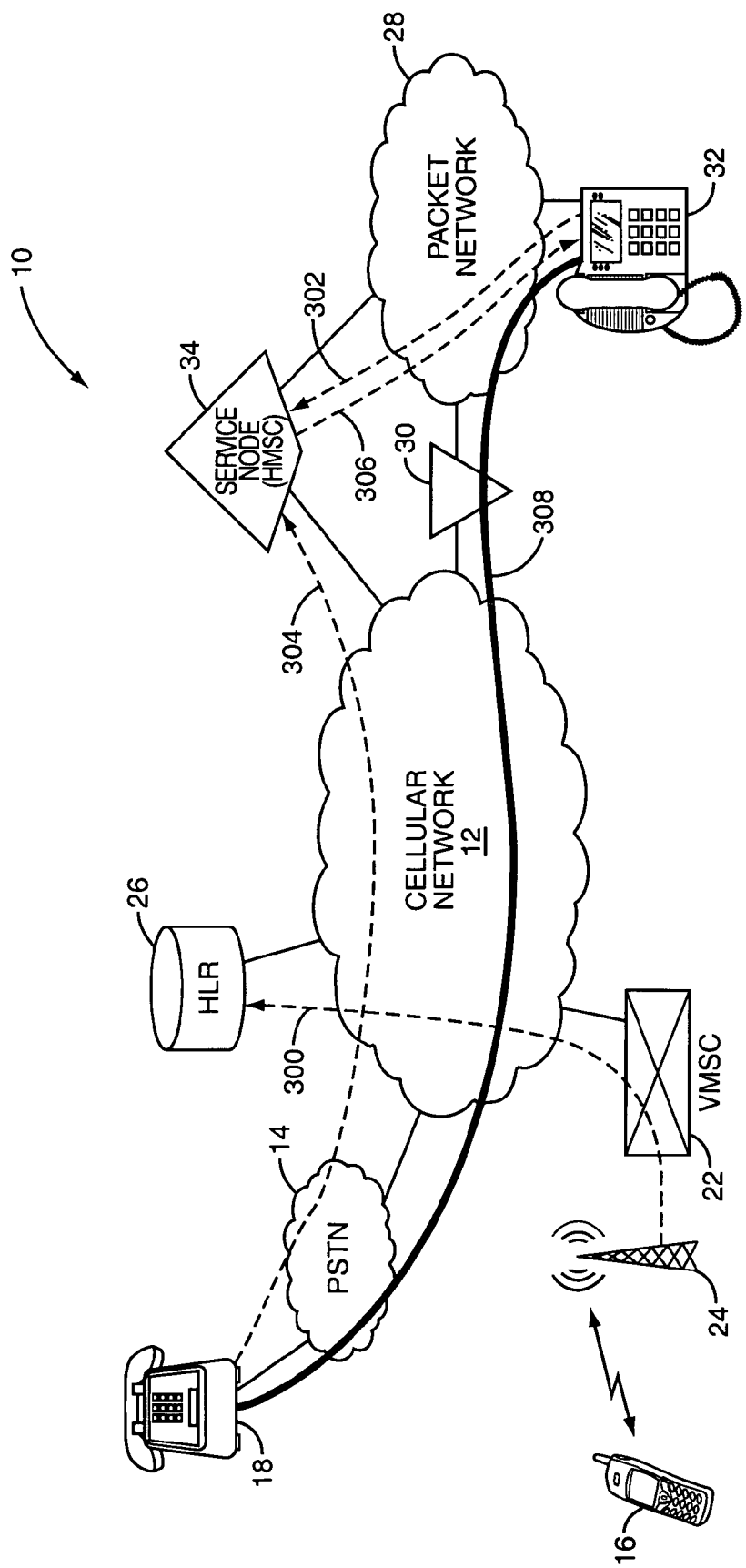
FIGS. 3A and 3B illustrate a communication environment in which a service node associated with a packet network emulates a home mobile switching center of a cellular network according to a second embodiment of the present invention.
Figure 3B:
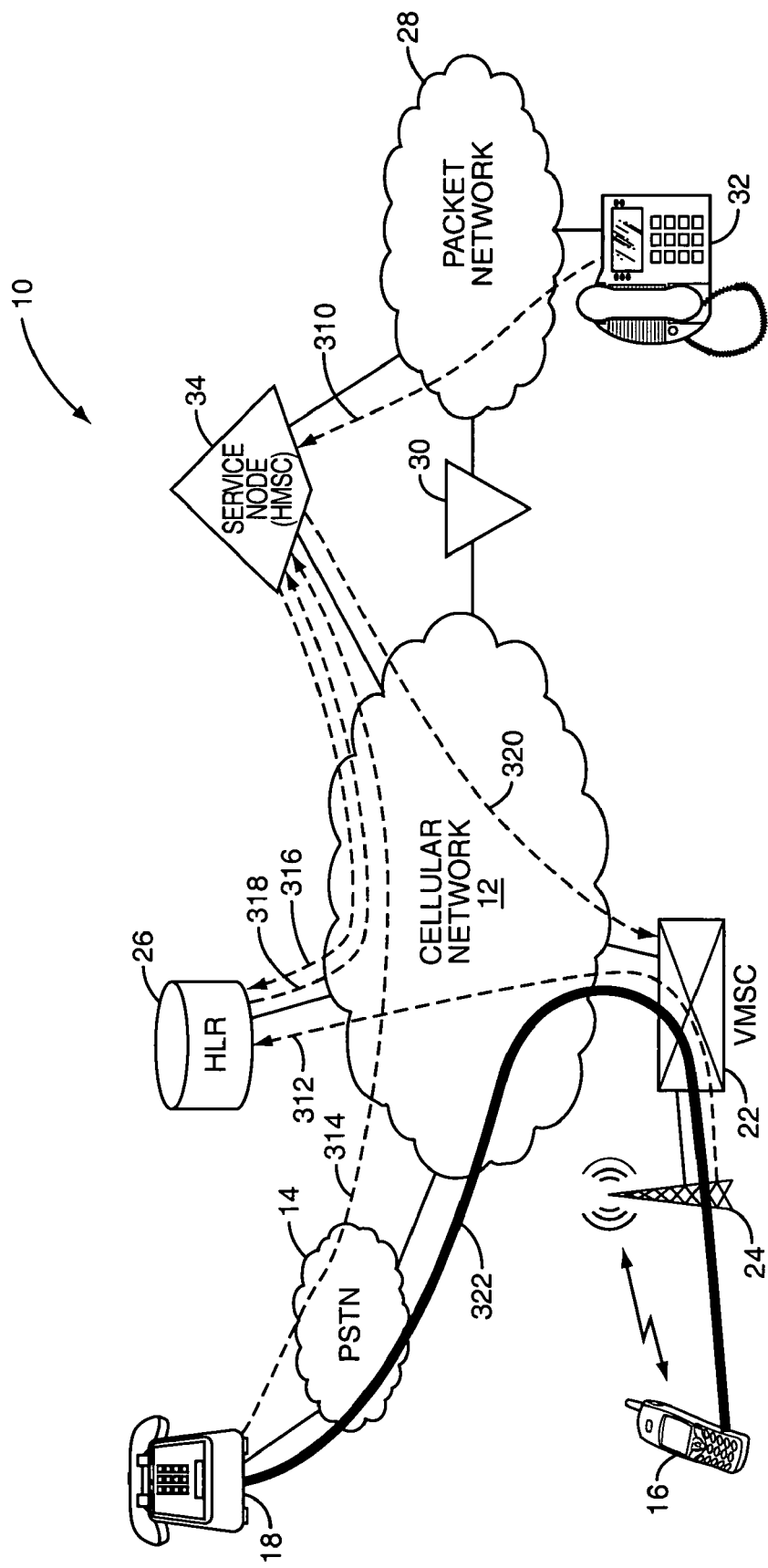

Turning now to FIGS. 3A and 3B, the service node 34 in this embodiment will emulate an HMSC of the cellular network 12. With particular reference to FIG. 3A, assume that either the mobile terminal 16 or the packet-based communication client 32 can use a common ID or be associated with a common directory number. Notably, a single device may be associated with multiple IDs and directory numbers. As such, various rules may be established and implemented by the service node 34 to determine the device to which incoming calls are routed. Assume that the mobile terminal 16 is roaming and is being supported by the VMSC 22. As such, a registration message will be sent to the HLR 26 to register the mobile terminal 16 in association with the VMSC 22 (step 300). Also assume that a packet-based communication client 32 is capable of communicating over the packet network 28, and will thus register with the service node 34 (step 302). The service node 34 is also associated directly or indirectly with the cellular network 12, and appears as an HMSC for the mobile terminal 16 as well as for the packet-based communication client 32. As such, when an incoming call is intended for either the mobile terminal 16 or the packet-based communication client 32, a call request will be routed through the cellular network 12 or PSTN to the service node 34 as if it were an HMSC (step 304). The service node 34 will determine where the call should be routed. Such determination may be as simple as always preferring the packet client whenever it is reachable or may use more complex rules including time of day, presence and other criteria. In this example the call should be routed to the packet-based communication client 32. As such, the service node 34 will send a call request, such as a SIP Invite message, to the packet-based communication client 32 (step 306), and a bearer path is established between the telephone terminal 18 and the packet-based communication client 32 through the PSTN 14, cellular network 12, gateway 30, and packet network 28 (step 308). Again, additional call setup messages will be provided in traditional fashion to establish a circuit-switched connection between the telephone terminal 18 and the gateway 30, as well as a packet session between the gateway 30 and the packet-based communication client 32.

Turning now to FIG. 3B, assume the packet-based communication client 32 is initially registered with the service node 34 (step 310), and the mobile terminal 16 is registered in association with the VMSC 22 and HLR 26 (step 312). When a call request for the mobile terminal 16, the packet-based communication client 32, or a combination thereof is routed to the service node 34 (step 314), which is acting as an HMSC for either the mobile terminal 16 or the packet-based communication client 32, the service node 34 may access the HLR 26 to obtain the relative location of the mobile terminal 16. In this example, assume a location request for the mobile terminal 16 is sent to the HLR 26 (step 316), which responds with information identifying the VMSC 22 as the MSC supporting the mobile terminal 16 (step 318). As such, the service node 34 may route the incoming call to the VMSC 22 (step 320), wherein a bearer path is established through the cellular network 12 between the telephone terminal 18 and the mobile terminal 16 through the VMSC 22 (step 322). As such, the service node 34 may determine whether or not to access the HLR 26 to obtain call routing information or general information to assist in determining how and where to route an incoming call intended for one or more communication clients, which may be mobile terminals or packet-based communication clients. In one embodiment, the service node 34 will route the call to packet-based communication clients that are registered with the service node 34, and if there are no such communication clients, it will access the HLR 26 to obtain routing information and then route the call accordingly.

Figure 4:
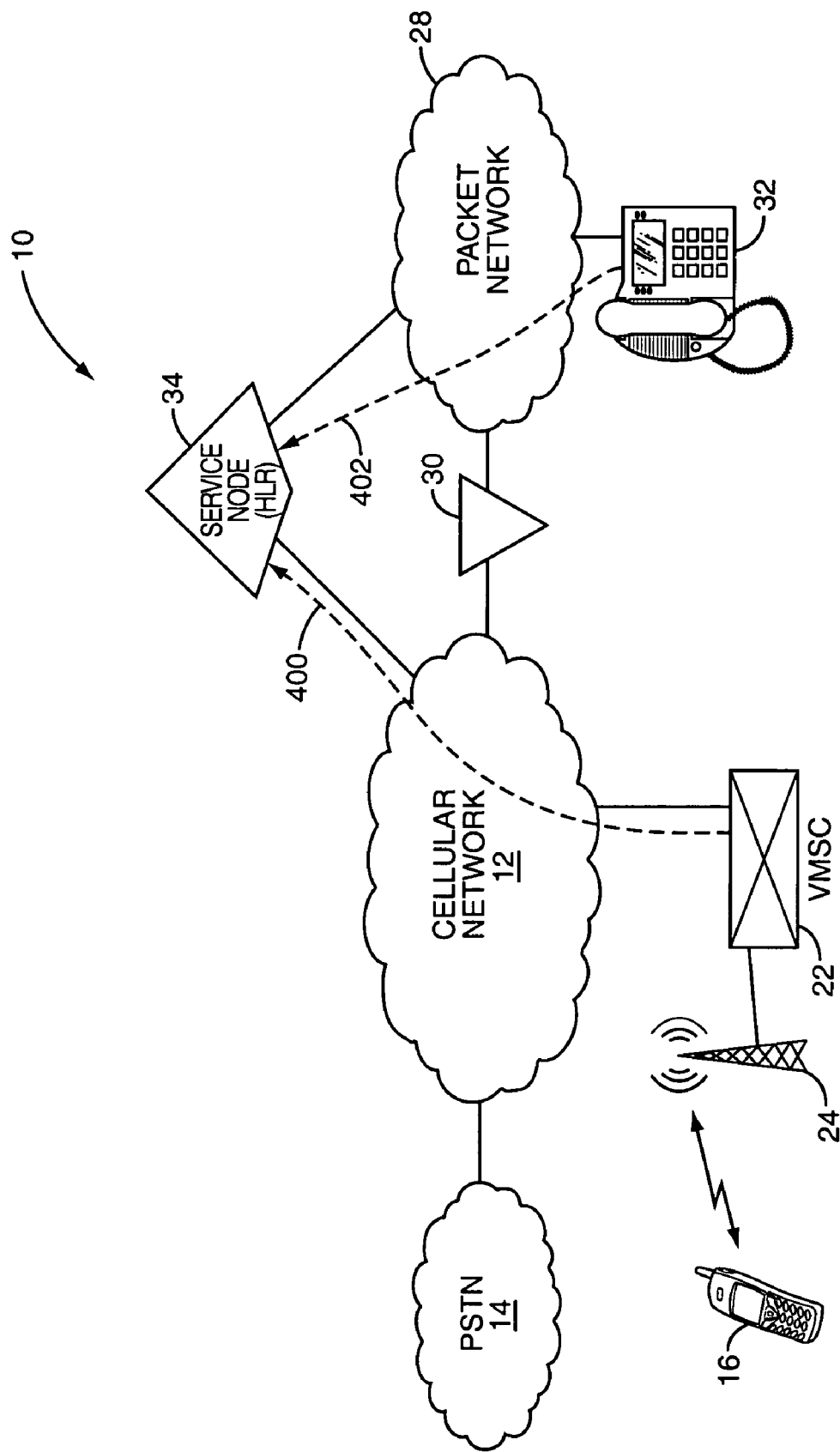
FIG. 4 is a communication environment in which a service node associated with a packet network emulates a home location register of a cellular network according to a third embodiment of the present invention.

Turning now to FIG. 4, the service node 34 may act as an HLR and allow registration of information related to the mobile terminal 16 from traditional VSMCs 22 (step 400), as well the registration of packet-based communication clients 32 over the packet network 28 (step 402). As such, HMSCs (not illustrated) may access the service node 34 to determine where and how to route an incoming call. The service node 34, when it is acting as an HLR, may provide call routing rules based on service provider or subscriber preferences. For example, the service node 34 may be configured to direct an HMSC 20 to route an incoming call to a client contact number associated with the gateway 30 when the packet-based communication client 32 is capable of communicating with the packet network 28 and has registered as such with the service node 34. The gateway 30 may alone or in association with other entities establish a circuit-switched call with the caller's device, and a packet session with the packet-based communication client 32. Thus, the service node 34 may act as a SIP proxy in a SIP environment, as well as an HLR for the cellular network 12.

Figure 5:
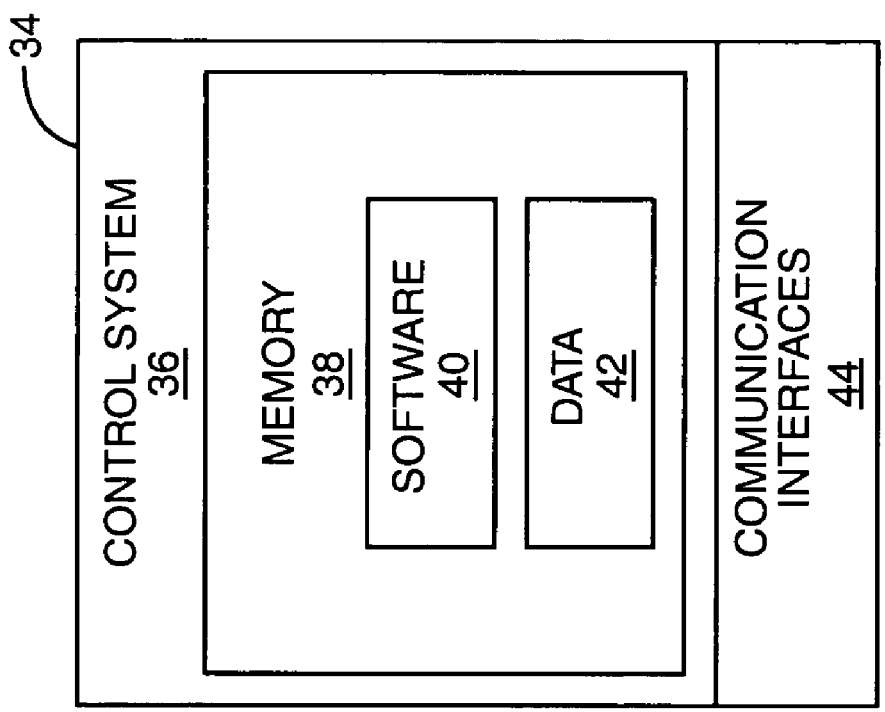
FIG. 5 is a block representation of a service node according to one embodiment of the present invention.

Turning now to FIG. 5, a block representation of a service node 34 is illustrated. The service node 34 may include a control system 36 having sufficient memory 38 to store the requisite software 40 to provide operation as described above. The memory 38 will also store the necessary data 42 required for operation. The control system 36 will be associated with one or more communication interfaces 44 to facilitate communication over the packet network 28 and perhaps the cellular network 12 in select embodiments.

Those skilled in the art will recognize improvements and modifications to the preferred embodiments of the present invention. All such improvements and modifications are considered within the scope of the concepts disclosed herein and the claims that follow.

What is claimed is:

1. A system for facilitating integration between cellular and packet networks comprising:
   a) at least one communication interface; and
   b) a control system associated with the at least one communication interface and adapted to:
      i) operate as a proxy to support packet-based communications with a packet communication client over the packet network;
      ii) emulate a call routing entity on the cellular network to support cellular communications over the cellular network, wherein the emulated call routing entity is a visited mobile switching center supporting the packet communication client;
      iii) receive a registration message from the packet communication client over the packet network; and
      iv) register the packet communication client such that the control system can operate as the proxy for packet communications.

2. The system of claim 1 wherein the control system is further adapted to:
   a) receive a call routing message from a home mobile switching center, which is associated as the home mobile switching center for the packet communication client; and
   b) route a call associated with the call routing message to the packet communication client over the packet network, such that a bearer path for the call extends over the cellular network and the packet network.

3. The system of claim 2 wherein the bearer path further extends through the home mobile switching center.

4. The system of claim 1 wherein the control system is further adapted to register the packet communication client with a home location register on the cellular network, such that the system appears as the visited mobile switching center supporting the packet communication client for incoming calls intended for the packet communication client over the cellular network.

5. The system of claim 4 wherein the packet communication client is associated with a cellular number on the cellular network, and registration with the home location register associates the cellular number with the system, such that the incoming calls to the cellular number are directed to the system.

6. A method for facilitating integration between cellular and packet networks from a common system comprising:
   a) providing a proxy to support packet-based communications with a packet communication client over the packet network;
   b) emulating a call routing entity on the cellular network to support cellular communication over the cellular network, wherein the emulated call routing entity is a visited mobile switching center supporting the packet communication client;
   c) receiving a registration message from the packet communication client over the packet network; and d) registering the packet communication client such the common system can operate as the proxy for packet communications.

7. The method of claim 6 further comprising:
a) receiving a call routing message from a home mobile switching center, which is associated as the home mobile switching center for the packet communication client; and
b) routing a call associated with the call routing message to the packet communication client over the packet network, such that a bearer path for the call extends over the cellular network and the packet network.

8. The method of claim 7 wherein the bearer path further extends through the home mobile switching center.

9. The method of claim 6 further comprising registering the packet communication client with a home location register on the cellular network, such that the common system appears as the visited mobile switching center supporting the packet communication client for incoming calls intended for the packet communication client over the cellular network.

10. The method of claim 9 wherein the packet communication client is associated with a cellular number on the cellular network and registration with the home location register associates the cellular number with the common system, such that the incoming calls to the cellular number are directed to the common system.

* * * * *